(No Model.) 2 Sheets—Sheet 1.

J. T. VAN GESTEL.
SECONDARY ELECTRIC BATTERY.

No. 358,092. Patented Feb. 22, 1887.

Witnesses:
W. J. Graham.
Geo. A. Porter.

Inventor.
Jean T. Van Gestel.
By W. F. Hapgood,
Attorney.

N. PETERS, Photo-Lithographer, Washington, D. C.

(No Model.) 2 Sheets—Sheet 2.

J. T. VAN GESTEL.
SECONDARY ELECTRIC BATTERY.

No. 358,092. Patented Feb. 22, 1887.

Witnesses:
W. J. Graham.
Geo. A. Porter.

Inventor.
Jean T. van Gestel.
By W. F. Hapgood.
Attorney.

UNITED STATES PATENT OFFICE.

JEAN TH. VAN GESTEL, OF NEW YORK, N. Y.

SECONDARY ELECTRIC BATTERY.

SPECIFICATION forming part of Letters Patent No. 358,092, dated February 22, 1887.

Application filed June 9, 1886. Serial No. 204,689. (No model.)

*To all whom it may concern:*

Be it known that I, JEAN TH. VAN GESTEL, a subject of the King of the Netherlands, residing at New York, in the county and State of New York, have invented a new and useful Secondary Electric Battery, of which the following is a specification.

My invention relates to improvements in secondary electric batteries; and the objects of my improvements are to provide a battery which is not liable to be injured or disarranged by handling or transportation, and the electrodes or elements of which are so constructed as to render their charging and discharging more complete and regular, and also that the accidental fracture of a plate will not stop its action or interfere with the working of the battery.

Figure 1:
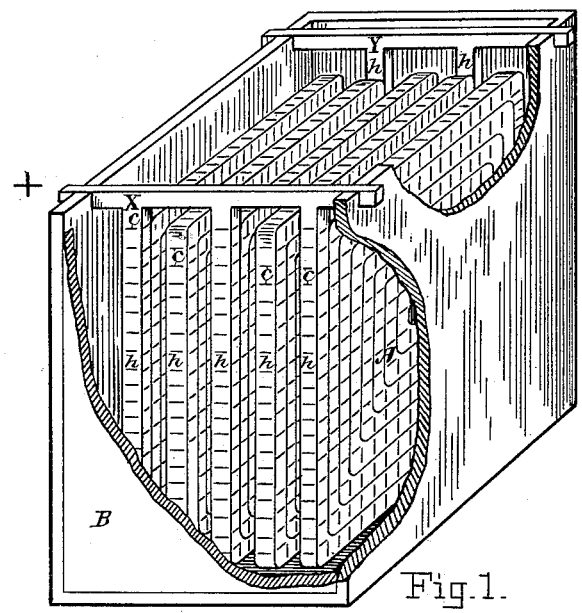
Figure 2:
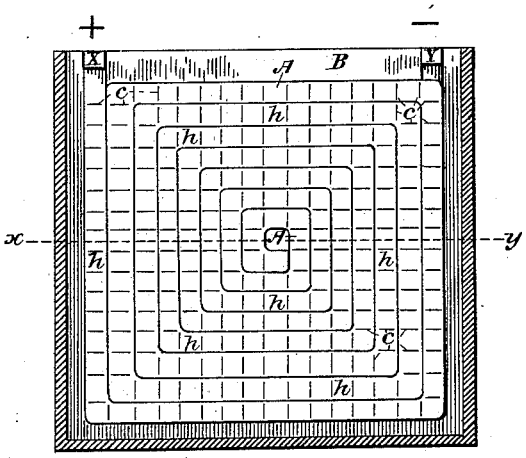
Figure 5:
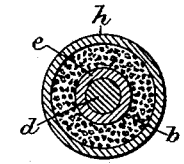
Figure 4:
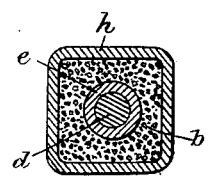
Figure 3:
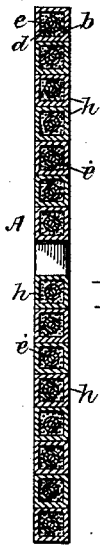
Figure 6:
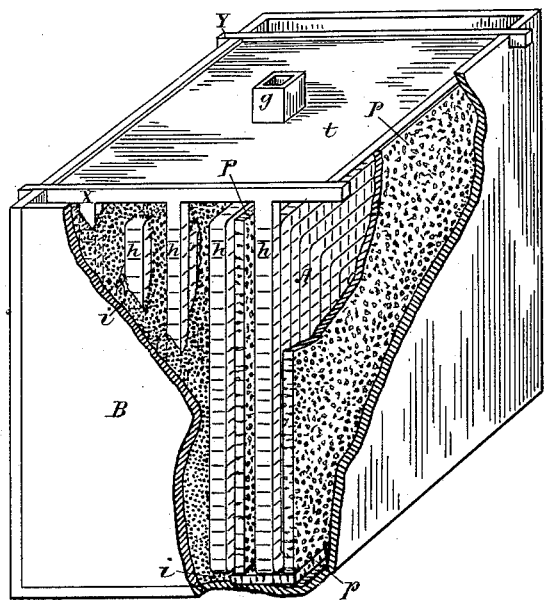
Figure 7:
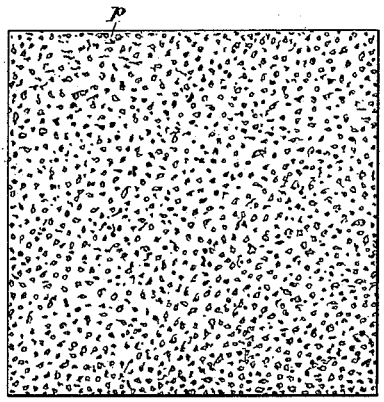

In the drawings, Figure 1 is a perspective view of the battery without cover or packing. Fig. 2 is a vertical longitudinal section of Fig. 1, showing an elevation of my improved electrode. Fig. 3 is a section of Fig. 2 on line $xy$. Figs. 4 and 5 are enlarged cross-sections of the electrode-tube. Fig. 6 is a perspective view of the battery, showing the different methods of packing the batteries and also the cover. Fig. 7 is an elevation of one of the packing-plates.

The electrodes or elements, as shown in Figs. 1 and 2, are constructed as follows: A lead tube, $h$, Figs. 3, 4, and 5, of sufficient length to form an electrode of the desired size, is filled with the active material of the battery $b$, or material adapted to become active—such as oxide of lead, granulated or spongy lead, or other equivalent material—and through the center of this filling a lead-coated conducting-wire, $d$, preferably of copper, is inserted. A section of the tube in this stage of the operation is shown in Fig. 5, where $h$ is the lead tube, $b$ the active filling, $d$ the wire conductor, and $e$ its lead coating. The tube is now coiled up so as to form what may be termed a "flat rectangular spiral," as is fully illustrated in Fig. 2, and it is then compressed so as to give the tube a rectangular form, as shown in Figs. 3 and 4. This method of coiling and forming the electrode is not essential to its proper operation, but is preferred, as it reduces the electrode to a very compact and convenient form. The several convolutions of the tube may now be united by fusing them together with a hot iron. Narrow cuts $c$ are now made across both faces of the electrode, and penetrating the tube $h$ to allow the battery solution to reach and saturate the active material within.

In the drawings, Figs. 3 and 4, $d$ is the conducting-wire, and $e$ represents the coating of lead.

It is evident from the above description that should the tube $h$ be fractured at any point the electric connection will not be interrupted as the conducting-wire traverses its entire length, and each portion of the tube and its contents will continue to act as before.

The casing B of the battery may be of any suitable material and of a form and size suited to the size and number of electrodes to be used. In the bottom of the case I place a layer, $i$, Fig. 6, of granulated glass, pumice-stone, or other equivalent non-conductive material, which is not acted upon by the battery-fluid used. The electrodes A A are then placed in the case in their proper positions, and the remaining space around and above them is tightly packed with the same granulated material, $i$, as the bottom layer. Instead of this granulated packing, it is evident that porous or finely-perforated plates or blocks of proper form may be used for filling the space in the case not occupied by the electrodes. This mode of packing I have shown at $p$ in Fig. 6. I also show one of these plates separately in Fig. 7. The ends of the tubes forming, respectively, the positive and the negative electrodes are brought together at convenient points at the top of the case in any convenient manner, as at X and Y, and the case is then hermetically sealed by a covering, $t$, Fig. 6, which is not affected by the battery solution, an opening, $g$, being left for the introduction of the battery solution, which may be closed in any suitable manner. This covering may be composed of a layer of asbestus-board, with a layer of pitch, paraffine, or similar material run over it; and its purpose is to prevent evaporation and also to secure the contents of the case against any displacement or movement.

splashing or washing of the battery solution during transportation or handling, and whether it is composed of material in a granular form or as porous or perforated plates the interstices or pores should be sufficiently large to allow of a free diffusion and circulation of the electrolytic fluid throughout the battery.

The practical operation of my improved battery does not differ from that of other secondary batteries, and the same battery solutions may be used; but it has great advantages over the batteries heretofore known.

A difficulty which has been experienced with secondary batteries is that the jarring incident to handling and transportation has shaken off or dislodged portions of the oxide or active material from the electrodes, which, collecting at the bottom of the battery, have formed a connection between the electrodes, thereby short-circuiting the battery.

In my improved battery the non-conducting packing retains the active material of the electrodes in place, even though the tubes $h$ should become oxidized or fractured. The packing also prevents all violent movements or washing of the battery solution, which tend to dislodge the comminuted active material, while it does not interfere with the diffusion of the solution or its action upon the electrodes. This feature of my battery renders it available for use upon railway-trains and in many other positions where the ordinary forms would be quickly destroyed by the continued and violent jarring to which they are subjected.

The advantages of my improved electrode are that while it embodies a very large amount of active material the internal resistance is very small, because of the conductive wire traversing the entire electrode at such short intervals of space, and for this reason the return of electricity will be a much greater proportion of the charge than is usual in this description of battery, and also the charging of the battery will be much more regular and The object of the packing is to prevent all thorough throughout. Another advantage of this electrode is that should the electrode be fractured the electric connection will not thereby be destroyed.

The lead coating around the conducting-wire $d$ is not essential to the working of the battery; but it will, by protecting the wire from the solvent or oxidizing action of the battery solution, greatly prolong the life of the battery.

The battery, arranged as above described, will operate perfectly with other electrodes than those herein described, as will also the electrodes in a battery which does not have the packing, and I do not limit myself to the combined use of both these elements of my invention.

I am aware of English provisional specification No. 5,843, dated December 22, 1883, and I make no claim to the matters therein described.

What I claim, and desire to secure by Letters Patent, is—

1. An electrode for a secondary battery, consisting of a perforated lead tube filled with active material, or material adapted to become active, through which passes a copper or other conductive wire, substantially as described.

2. An electrode for a secondary battery, consisting of a perforated lead tube filled with active material, or material adapted to become active, through which passes a lead-covered conducting-wire, substantially as described.

3. The combination of a perforated lead tube filled with active absorptive material, and a metallic conducting-wire traversing the same, substantially as set forth.

4. The combination of a perforated lead tube filled with finely-divided lead, and a lead-covered metallic conducting-wire inserted within the tube, substantially as described.

JEAN TH. VAN GESTEL.

Witnesses:
ERNEST H. PILSBURY,
W. G. NEAR.